2,737,519

PYROLYSIS OF RICINOLEIC ESTERS

Paul Gregory, Michailas Genas, and Oscar Kostelitz, Paris, France, assignors to "Organico," Paris, France, a corporation of France No Drawing. Application January 29, 1953,
Serial No. 334,096

Claims priority, application France August 26, 1947

5 Claims. (Cl. 260—410.9)

This application is a continuation-in-part of our pending U. S. application Ser. No. 42,152, filed August 2, 1948, now abandoned.

This invention relates to the pyrolysis of ricinoleic esters. It is known that the esters of ricinoleic acid are decomposed under the action of heat with the production of oenanthic aldehyde or heptanal and the undecylenic ester of the particular alcohol which relates to the ricinoleate used. The reactions which is observed appears to follow the equation:

$$CH_3(CH_2)_5CH(OH)CH_2CH=CH(CH_2)_7COOR \rightarrow$$

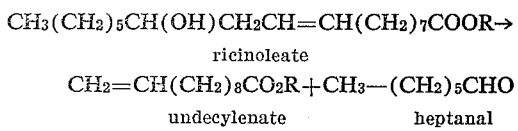

$$CH_2=CH(CH_2)_8CO_2R + CH_3-(CH_2)_5CHO$$

undecylenate        heptanal wherein R is an alkyl radical.

However, when the ester used is glyceric ester, heptanal and undecylenic acid are produced.

The above pyrolytic reactions occur at comparatively high temperatures (480–500° C.) and are accompanied by side reactions which result in a decrease of the yield in heptanal and undecylenate or undecylenic acid.

The side reactions which occur are mainly due to the fact that the heat causes destruction of the heptanal and dehydration of the ricinoleate into esters of linoleic acid.

It has already been proposed to pyrolyse ricinoleic esters at temperatures within a range of 480–500° C. (Cf. Chemical Abstracts 1937, page 7447[4], Sokov Russian Patent 43,421). The temperatures, used in the Sokov patent, are from 480 to 500° C. According to Sokov, the pyrolysis of ethyl ricinoleate gives 24% by weight of undecylenic acid and not of undecylenic ester. However, the vapors formed were delivered through a heated tube prior to condensation. It was apparently believed that a period of dwell within the heated zone was necessary in order to obtain the desired reaction of pyrolytic splitting. On the other hand, we have discovered that the pyrolytic splitting reaction at 450° C. and at higher temperatures is practically instantaneous and already occurs during the actual vaporization process, and that increasing the time of dwell at high temperature has no other effect but to destroy the reaction products and cause a drop in yield. By introducing the ricinoleic esters at a sufficiently high rate and condensing the resulting vapors as quickly as possible, the destruction of the reaction products is prevented and very high yields in heptanal and undecylenic ester are obtained.

It is an object of our present invention to provide a method of pyrolysing ricinoleic esters wherein the side reactions are greatly reduced and which results in excellent yields of undecylenic ester and heptanal.

The invention is more particularly concerned with a method of producing heptanal and undecylenic esters, which comprises rapidly introducing liquid ricinoleic esters into a heated zone containing a practically non-reactive body which has high heat stability, maintaining said body at a temperature substantially within the range of from 400° C. to 650° C., discharging the pyrolyzed vapors from the zone as they are evolved, and condensing said vapors by cooling.

The temperature of the body serving to cause pyrolysing vaporization according to the method of the invention should be substantially in the range of from 400° C. to 650° C., the preferred range being from 500° C. to 600° C.

In the temperature range of from 400° C. to 650° C., the conversion ratio, i. e. the proportion of converted ricinoleate, increases with increasing temperature, while the yield of reaction products drops off from the theoretical yield, as will be seen from the following table. This table presents by way of example, the conversion ratios and yield obtained when pryolysing methyl ricinoleate.

| Temperatures, ° C. | Conversion ratios, percent | Yields, percent |
|---|---|---|
| 500 | 48 | 88 |
| 550 | 70 | 86 |
| 600 | 88 | 77 |
| 650 | 96 | 63 |

We have found that the rate of input of the ricinoleic esters should be at least about 8 kilograms per hour per liter of the heated zone. However there cannot be stated an upper limit for the range of satisfactory input rates. Since the pyrolysis reaction is practically instantaneous, such an upper limit will be determined only by the possibility of transmitting the requisite amount of heat to the heated zone for maintaining the requisite reaction temperature. It will readily be understood that the said upper limit will vary with the design and construction of the reactor used.

The condensate may be separated into its constituents by distillation. If unreacted ricinoleate is found to remain, it is recycled into the pyrolysis reactor.

The pyrolysis can be accomplished on a contacting surface formed by a chemically inert, non catalytic, heat stable, normally solid substance, having preferably a high coefficient of heat transmission, for example on heated metallic surfaces. However, ordinary cast iron, iron and steel are found to exert an unfavorable catalytic action and to reduce the yield. On the other hand the stainless steel alloys containing nickel, cobalt, chromium, and one or more of molybdenum, vanadium, tantalum, and the like, may be successfully used. Other metals or alloys having a melting point over about 650° C. may also be used. The so-called refractory material such as quartz, refractory bricks, and the like may also be used according to the invention. However metals have the advantage of higher thermal conductivity, thereby ensuring better heat transfer and greater uniformity in the surface temperatures.

Liquid substances can also be used such for instances as any metals or alloys having a melting point under 650° C. (with the exception of mercury because its boiling point is below the reaction temperature range, and the alloys thereof because they decompose at temperatures under 450° C. with evolution of mercury in the vapor state and also with the further exception of alkali and alkali-earth metals). Molten salts and mixtures of molten salts are likewise suitable, provided they are stable at the temperatures involved, and do not react with the reaction products.

Numerous types of apparatus may be used in carrying into practice the method of the invention. A few illustrative examples of suitable types will now be given, it being understood that they entail no limitation of the scope of the invention, which is independent of the use of any specific apparatus or heating means therefor.

The apparatus used in carrying out the invention may comprise a heated hearth made of metal or refractory materials, which may or may not be provided with a coating layer of molten metals or salts, and fitted with an overlying gas-tight bell-jar receiver provided with an outlet pipe and means for feeding the product to be pyrolysed to the surface of the hearth.

It may alternatively comprise a drum rotatably mounted within a sealed chamber internally heated with electric resistance means or hot gas circulation or any other suitable means. The product to be pyrolysed is sprayed on to the side surface of the drum along a generatrix thereof parallel with the axis of the drum.

As a further alternative a bath of molten metal may be used with tubes dipping thereinto through which the product to be pyrolysed is supplied by means of a pump.

The ricinoleic esters subjected to pyrolysis reaction according to the invention are preferably ricinoleic esters of mono-alcohols having less than six carbon atoms in the molecule thereof.

These esters may be used, both in a pure state and in the form of a mixture comprising all of the alcoholysis products of castor oil. Alcoholysis, as is well-known, consists of converting glycerides into corresponding esters of any selected alcohol through heating said glycerides with an excess of said alcohol in the presence of suitable acidic or alkaline catalysts. For example, in the case of the conversion of triricinolein into methyl ricinoleate, the reactions may be expressed as follows:

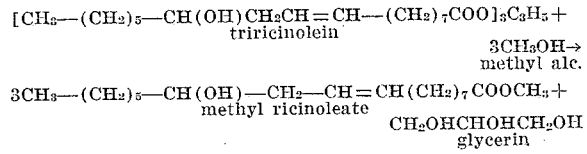

The products of the alcoholysis of the castor oil comprises the esters of all of the fatty acids of said oil.

Some illustrative examples will now be described when starting from castor oil with a preliminary alcoholysis step, it being understood that the examples in no way form a limitation of the invention.

*Example I*

1 kilogram of castor oil of a usual commercial grade and 1 kg. of methyl alcohol containing 20 g. concentrated sulphuric acid are heated for 6 hours at reflux temperature. The reaction product is poured into 5 litres water. The crude methyl ricinoleate separates off forming a supernatent oily layer which is then washed with water containing some sodium carbonate, followed by washing with pure water. The crude methyl ricinoleate is then dried by heating in vacuo to about 100° C. One kilogram crude methyl ricinoleate is thus obtained comprising the methyl esters of all of the constituent acids in the castor oil.

The resulting product is pyrolysed in an apparatus comprising a quartz cylinder 30 mm. in diameter and 150 mm. in height, sealed at its bottom end, and which is placed vertically in an electric furnace. The cylinder projects into the furnace to about 80 mm. from the lower end of the cylinder. It is provided with lead which in the molten state forms a layer 50 mm. deep. The volume of heated zone so formed is 20 cc. The cylinder is further provided with an outlet tube leading into a descending refrigerator, and with an inlet tube and a pyrometer contacting the top surface of the molten lead. The temperature at the molten lead surface is maintained at 550° C. to 560° C. and 1 kg. of crude methyl ricinoleate is added over 5 hours.

The rate of feed is 200 grams per hour per 20 cc. of the heated zone, or, if preferred to one liter of the heated zone, 10 kg. per hour per liter. About 970 g. distillate is recovered which is subjected to a fractionating step.

The fraction passing up to 100° C. is first separated under a pressure of 15 mm. Hg. This fraction contains 190 g. heptanal at 90% concentration equivalent to about 170 g. pure heptanal. Next, 300 g. methyl undecylenate are distilled off in the range of from 130° to 135° C. under 5 mm. Hg pressure. The distillation residue is recycled into the pyrolysis apparatus. As a result of the recycle an additional 41 grams heptanal and 92 grams methyl undecylenate are obtained.

As a net result one kilogram of castor oil yields under the above-stated conditions; 210 grams heptanal and 392 grams methyl undecylenate equivalent to 365 grams undecylenic acid.

*Example II*

In the apparatus described above in Example 1, the lead is replaced with so-called Fontainebleau sand (quartz sand). The pyrolysis was effected at from 480° to 500° C. at a rate of 1 kg. over 6 hours or at a rate of about 8 kg. per hour per liter of the heated zone. In the cracked products 159 g. oenanthol and 299 g. methyl undecylenate were separated off.

The distillation residuum was subjected to pyrolysis under similar conditions as in the main operation. Recycling yielded 31 g. oenanthol and 36 g. methyl undecylenate thus bringing the total amount of oenanthol obtained up to 190 g. and 335 g. methyl undecylenate for 1 kg. methyl ester from the totality of the constituent acids in the castor oil.

*Example III*

In the same apparatus as that described above in Example 1 the lead was replaced with a solid cylinder made of stainless steel containing 18% chromium and 8% nickel. The pyrolysis was effected at 550° C. to 570° C. with recycling at 600° C. on 1 kg. of the alcoholysis product of castor oil with ethyl alcohol.

For 1 kg. of the ethyl esters mixture of the fatty acids constituting the castor oil 195 g. oenanthol and 385 g. ethyl undecylenate were obtained.

The input period for one kilogram of the ethyl ricinoleate was five hours.

*Example IV*

The apparatus used in this example is the same as in Example 1, except that the depth of the layer of molten lead was 75 mm. instead of 50 mm.

The volume of the heated zone thus formed was about 3 cc. One kg. of crude methyl ricinoleate was gradually fed on the molten lead maintained at 565° C. to 570° C. for five hours, that is a rate of about 60 kg./hour/liter of the heated zone. Out of the resulting condensate, 195 g. heptanal and 335 g. methyl undecylenate were distilled off. Recycling the distillation residuum yielded 50 g. methyl undecylenate and 25 g. heptanal.

If, in the apparatus described in Example I, the height of the layer of lead is reduced to 30 mm., the volume of the heated zone becomes 35 cc. By supplying raw methyl ricinoleate, at a rate of 200 grams per hour, which corresponds, for 1 liter of the heated zone, to 6 kg. per hour, there is formed, aside from undecylenic ester, free undecylenic acid. By recycling the non-converted ricinoleic ester, there is obtained altogether 300 grams of undecylenic acid, in part as free acid and in part as methyl ester, for 1 kg. of raw methyl ricinoleate, which corresponds to 1 kg. of castor oil; this shows a drop of yield relatively to the yield of 365 grams obtained for a rate of 10 kg. per hour per liter of the heated zone, as in Example I.

What we claim is:

1. A method of producing heptanal and undecylenic esters comprising supplying liquid ricinoleic esters of lower aliphatic monohydric alcohols, said alcohols containing less than 6 carbon atoms into a heated zone provided by a hot non-catalytic inert stainless steel contacting surface, said stainless steel surface being maintained at a temperature in the range from about 400° C. to about 600° C., said ricinoleic esters being supplied at a rate of at least 8 kg. per hour per liter of volume in said heated vone, eliminating the pyrolysed vapors from the heated zone substantially as fast as they are formed and thereafter rapidly cooling the vapors to condense them.

2. A method of producing heptanal and undecylenic esters comprising supplying liquid aliphatic monohydric alcohol esters of castor oil fatty acids, the alcohol having less than 6 carbon atoms, into a heated zone provided by a hot non-catalytic inert stainless steel contacting surface, said stainless steel surface being maintained at a temperature in the range from about 400° C. to about 600° C., said ricinoleic ester being supplied at a rate of at least 8 kg. per hour per liter of volume in said heated zone, eliminating the pyrolysed vapors from the heated zone substantially as fast as they are formed and thereafter rapidly cooling the vapors to condense them.

3. A method of producing heptanal and undecylenic esters comprising supplying liquid ricinoleic esters of mono-alcohols, said alcohols having less than six carbon atoms in the molecule thereof into a heated zone provided at a base surface thereof with an inert body made from a material of the group consisting of molten metals and molten metal alloys having a boiling point substantially above 650° C., said material being non-reactive with the materials supplied, said inert body being maintained at a temperature in the range from about 400° C. to about 600° C., at a rate of at least 8 kg. per hour per liter of volume of heated zone, eliminating the pyrolysed vapors from the heated zone substantially as fast as they are formed and thereafter rapidly cooling the vapors to condense them.

4. A method as in claim 3 wherein said inert body is made from a material of the group comprising metals and metal alloys having a melting point substantially below 630° and a boiling point substantially above 650°, said material being non-reactive with the materials supplied and the reaction products formed under the pyrolysis condition.

5. A method of producing heptanal and undecylenic esters comprising supplying a mixture of mono-alcohol esters of the whole fatty acids contained in castor oil, the mono-alcohols having less than six carbon atoms into a heated zone provided at a base surface thereof with an inert body made from a material of the group consisting of molten metal and molten metal alloys having a melting point substantially below 630° and a boiling point substantially above 650° said material being non-reactive with the materials supplied, said inert body being maintained at a temperature in the range from about 400° C. to about 600° C., at a rate of at least 8 kg. per hour per liter of volume of heated zone, eliminating the pyrolysed vapors from the heated zone substantially as fast as they are formed and condensing the pyrolysed vapors by cooling.

References Cited in the file of this patent

UNITED STATES PATENTS 1,697,337　　Adams et al. _____ Jan. 1, 1929

FOREIGN PATENTS 454,133　　Italy _____ Jan. 12, 1950

OTHER REFERENCES

Haller: Comptes Rendus, Tome (1907), pages 462, 463 to 466.

Namekin et al.: Chem. Abs., vol. 36 (1942), page 3782.